(12) United States Patent
Huang

(10) Patent No.: US 6,244,975 B1
(45) Date of Patent: *Jun. 12, 2001

(54) WATER RESISTANT HANDLE GRIP

(76) Inventor: Ben Huang, 16652 Gemini La., Huntington Beach, CA (US) 92647

( * ) Notice: Subject to any disclaimer, the term of this patent is extended or adjusted under 35 U.S.C. 154(b) by 0 days.

This patent is subject to a terminal disclaimer.

(21) Appl. No.: 09/277,032

(22) Filed: Mar. 25, 1999

Related U.S. Application Data (60) Continuation-in-part of application No. 09/042,290, filed on Mar. 15, 1998, now Pat. No. 5,910,054, which is a division of application No. 08/787,828, filed on Jan. 23, 1997, now Pat. No. 5,730,669.

(51) Int. Cl.[7] ................................... A63B 53/14
(52) U.S. Cl. .................. 473/300; 473/301; 473/409; 427/380.5; 29/458
(58) Field of Search ..................... 473/300, 301, 473/568, 549, 538, 409; 29/458, 460, 514, 33.5, 33 Q; 427/385.5, 389.9, 393.4; 156/176

(56) References Cited

U.S. PATENT DOCUMENTS

| | | | |
|---|---|---|---|
| 2,836,420 | * 5/1958 | Lamkin et al. | 273/81.6 |
| 3,582,456 | * 6/1971 | Stolki | 161/165 |
| 4,138,518 | * 2/1979 | Sammak et al. | 428/95 |
| 4,205,112 | * 5/1980 | Mervin | 428/245 |
| 5,026,872 | * 6/1991 | Kohli | 548/521 |
| 5,816,934 | * 10/1998 | Huang | 473/301 |

* cited by examiner

Primary Examiner—Jeanette Chapman
Assistant Examiner—Sneh Varma
(74) Attorney, Agent, or Firm—Fulwider Patton Lee & Utecht, LLP

(57) ABSTRACT

A moisture resistant shock absorbing grip for the handle of a golf club, tennis racquet, racquetball racquet, baseball parts or other impact departing devices such as hammers, having a strip formed of a polyurethane layer bonded to a felt layer. The exterior of the strip is coated with a waterproof material while the side edges are formed with recessed reinforcement side edges and skived side edges which are overlapped to form a water retarding joint between the side edges of the strip.

6 Claims, 8 Drawing Sheets

WATER RESISTANT HANDLE GRIP

This application is a continuation-in-part of U.S. patent application Ser. No. 09/042,290, filed Mar. 13,1998, now U.S. Pat. No. 5,910,054, issued Jun. 8, 1999 which was a division of U.S. patent application Ser. No. 08/787,828, filed Jan. 23, 1997, now U. S. Pat. No. 5,730,669.

BACKGROUND OF THE INVENTION

The present invention relates to an improved grip for handles that are subject to shock when such devices are impacted.

Applicant has previously developed resilient grips which successfully reduce shock to the muscle and arm joints of the users of golf clubs, tennis racquets, racquetball racquets, baseball bats and other impact imparting devices such as hammers. See for example U.S. Pat. No. 5,374,059 granted to applicant Dec. 20, 1994. Such earlier grips utilize a polyurethane layer bonded to a felt layer to define a strip which is spirally wrapped around the handle of a racquet or the like to conform to the external configuration of such handle. In such earlier grips of applicant's design, the thickness of the polyurethane layer relative to the thickness of the felt layer as compared to prior art resilient grips, i.e., the ratio of the thickness of the polyurethane layer to the thickness of the felt layer was a minimum of approximately 0.18 with the thickness of the polyurethane layer being about equal to or thicker than the thickness of the textile layer in a typical grip of my design. In certain of such grips, the handle-abutting side of the strip utilized skiving, with the felt layer tapering from the side edges of the strip. The side edges of the strip were overlapped as the strip was wrapped around the handle or over a resilient sleeve telescopically carried by the handle.

My previously developed resilient grips afforded important advantages over prior art grips. However, problems were sometimes encountered with unraveling of the strip from the handle or the sleeve after use. Additionally, interference with other golf grips could occur where one of the golf clubs is removed from a golf bag. Another problem common to polyurethane-felt golf club and tennis racquet grips is slippage of the grip when moisture accumulates thereon as from perspiration or rainy conditions. Such slippage results in diminished control of the golf club or tennis racquet. A further problem inherent to the use of grips of a color other than black is ugly staining of the grip after use.

SUMMARY OF THE INVENTION

Applicant has developed an improved water-resistant, unraveling-resistant golfclub or tennis racquet handle grip which inhibits the formation of moisture on the grip and thereby reduces any tendency of slippage between the grip and the user'hands. Such water resistant handle grip permits a golfer to continue playing even during rainy conditions and minimizes the slippage effect of perspiration build-up on the golf club or tennis racquet. Additionally, my improved grip prevents accumulation of stains and dirts all the time.

Unraveling of the grip is inhibited by forming recessed reinforcement edges on the sides of the polyurethane layer of the grip and skived sides on the felt layer of the grip. Such recessed reinforcement side edges also inhibit interference with other golf clubs when one of the clubs is removed from a golf bag.

These and other features and advantages of the present invention will become apparent from the following detailed description of a preferred embodiment which, taken in conjunction with the accompanying drawings, illustrates by way of example the principles of the invention.

DETAILED DESCRIPTION OF PREFERRED EMBODIMENT

Referring to the drawings, a preferred handle grip embodying the present invention utilizes an elongated resilient strip S which is spirally wrapped about the handle of a golf club, tennis racquet, racquetball racquet, baseball bat or other impact departing devices such as hammers. Strip S includes an open-pored felt layer generally designated 22 having an inner or bottom surface 24 which is adhered to a bare tennis racquet handle (not shown), to a golf club handle H or to an underlisting sleeve attached to a golf club handle (not shown). The strip S also includes a layer of a suitable resilient synthetic plastic material such as a smooth closed-pore polyurethane layer generally designated 26 which is bonded to the felt layer 22. The bonded-together polyurethane and felt layers are seen to be configured as the unitary strip S.

Figures 2, 3, 4:
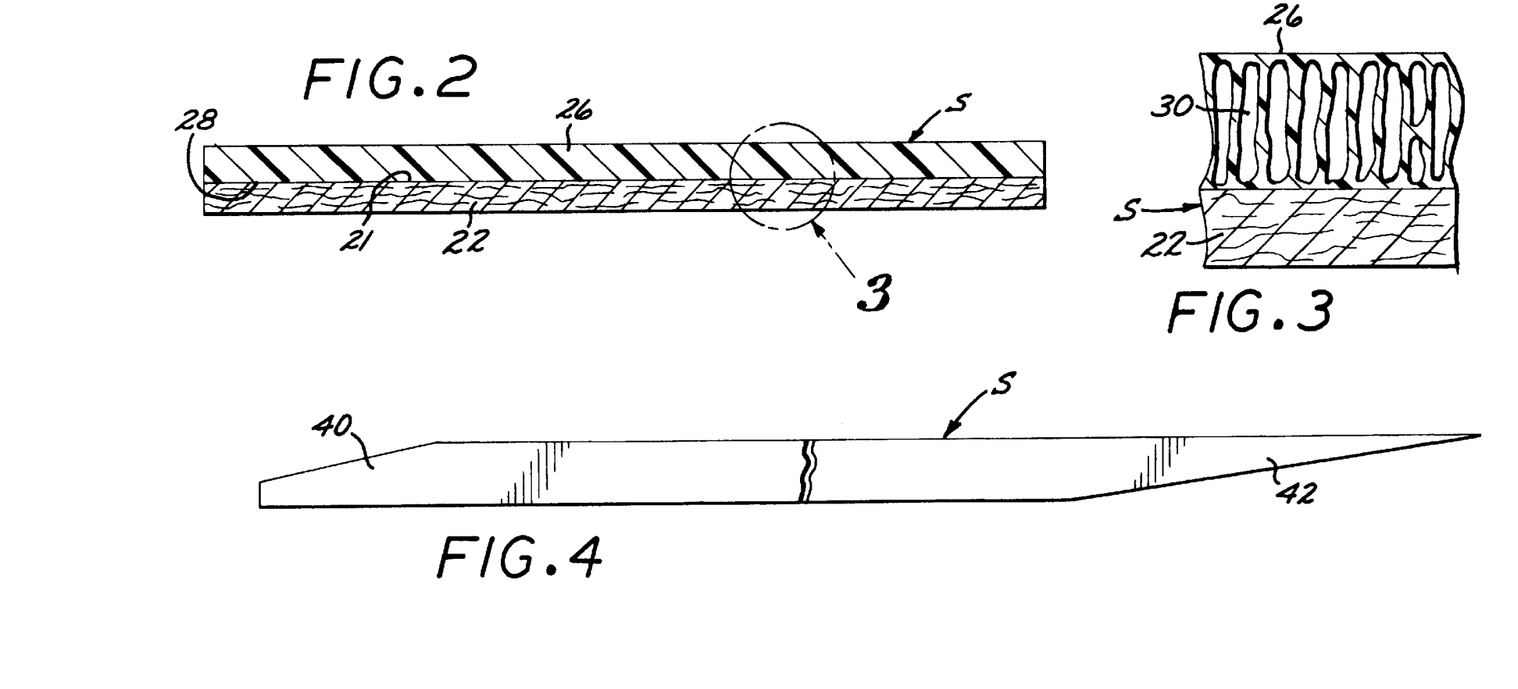
FIG. 2 is an enlarged vertical sectional view taken along line 2—2 of FIG. 1.
FIG. 3 is a further enlarged view of the encircled area designated 3 in FIG. 2.
FIG. 4 is a broken top plan view of the strip of FIG. 1 after the ends of such strip have been cut to form leading and trailing ends.
Figure 25:
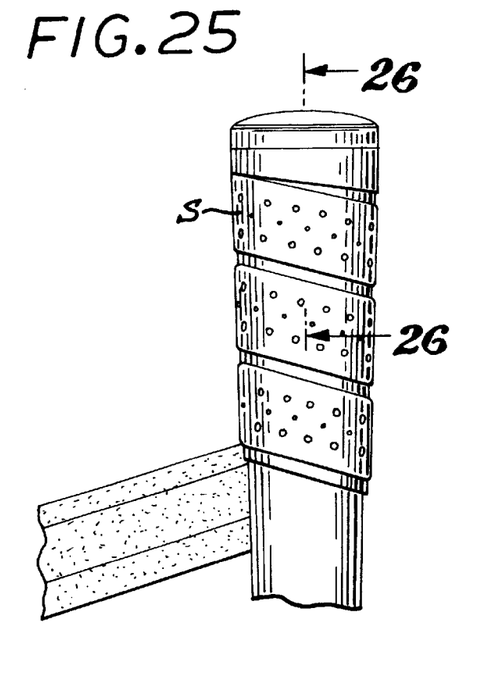
FIG. 25 is a broken side elevational view showing a polyurethane-felt strip embodying the present invention being spirally wrapped about a golf club handle.
Figure 26:
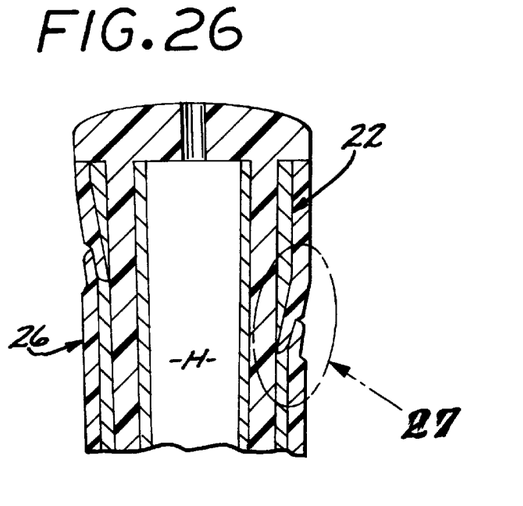
FIG. 26 is a vertical sectional view taken in enlarged scale along line 26—26 of FIG. 25.
Figure 27:
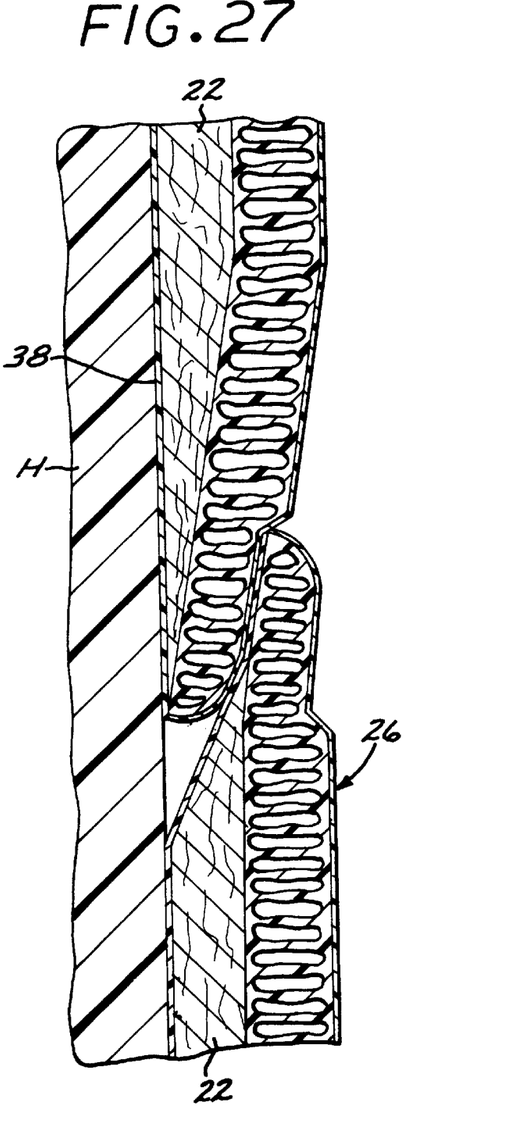
FIG. 27 is a further enlarged vertical sectional view of the area designated 27 in FIG. 26.

More particularly, the porous felt layer 22 has its upper or outer surface 27 bonded to the lower surface 28 of the polyurethane layer 26. As indicated in FIG. 3, the polyurethane layer 26 is formed with pores 30 which extend vertically, i.e., generally normal to the longitudinal axis of the strip S or golf club handle H when the grip has been affixed to such handle (FIGS. 25,26 and 27). The polyurethane layer 26 may be formed in a conventional manner by coating one side of a felt strip with a solution of polyurethane (e.g. polyester or polyether) dissolved in a dimethyl formamide (DMF), immersing the coated strip in water baths to displace the DMF causing the urethanes to coagulate, and finally driving off the water by the application of pressure and heat. In this manner, the pores 30 will extend perpendicularly relative to the longitudinal axis of the strip, while the underside 28 of the polyurethane layer 26 is bonded to the upper surface of the felt strip. As noted hereinbefore, applicant has discovered that greatly improved shock absorbing qualities may be obtained in a racquet grip or golf club grip where the thickness of the polyurethane layer to the thickness of the felt layer is increased over the thickness of the felt layer employed in prior art grips. More specifically, applicant considers that the ratio of the thickness of the polyurethane layer to the textile layer should be a minimum of approximately 0.18.

Figures 15, 16, 17, 18:
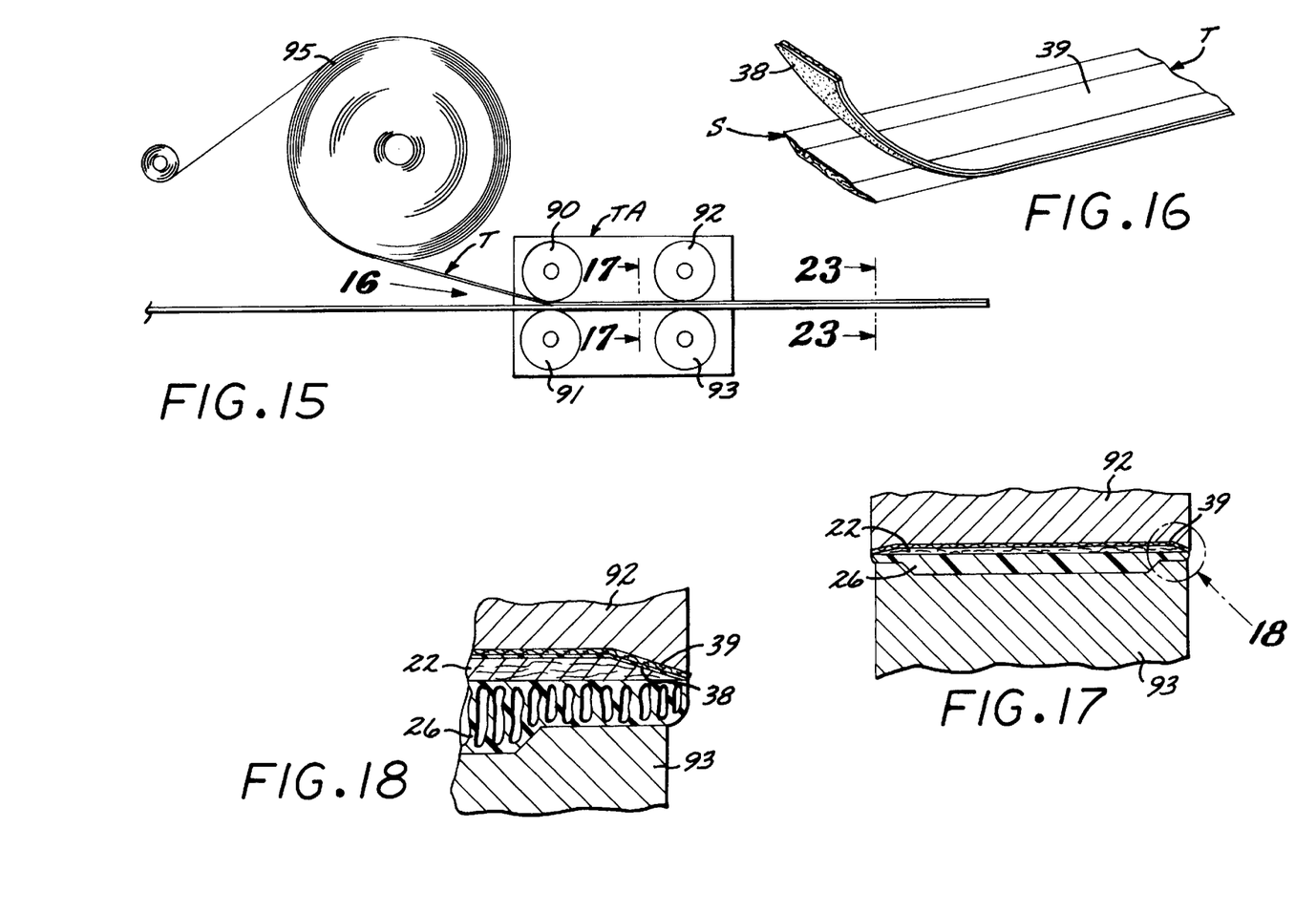
FIG. 15 is a side elevational view showing the underside of the strip receiving an adhesive coating.
FIG. 16 is a broken perspective view taken from the point designated 16 in FIG. 15.
FIG. 17 is a vertical sectional view taken in enlarged scale along line 17—17 of FIG. 15.
FIG. 18 is a still further enlarged view of the encircled area designated 18 in FIG. 17.
Figure 19:
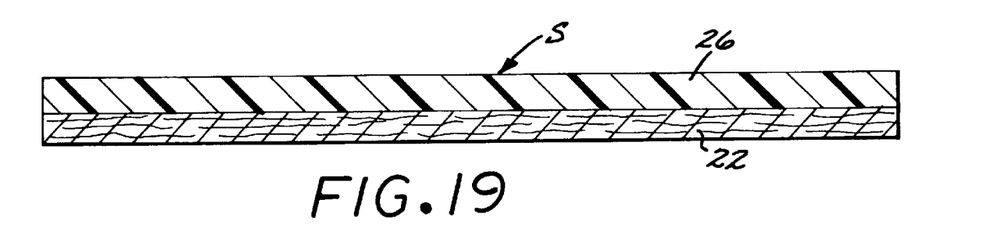
FIG. 19 is a vertical sectional view taken in enlarged scale along line 19—19 of FIG. 5.
Figure 20:
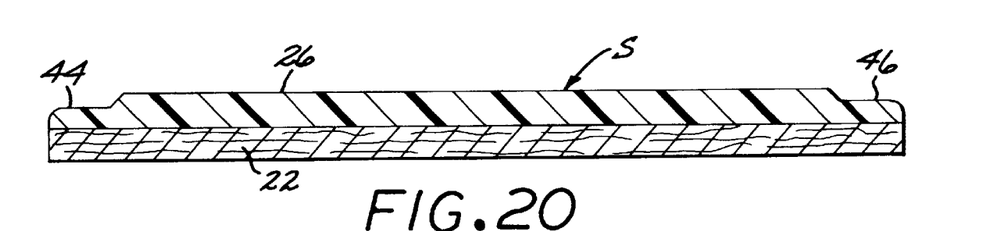
FIG. 20 is a vertical sectional view taken in enlarged scale along line 20—20 of FIG. 5.
Figure 21:
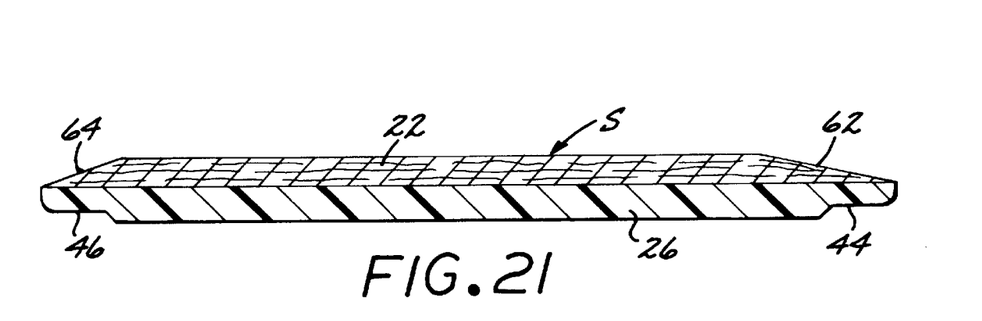
FIG. 21 is a vertical sectional view taken in enlarged scale along line 21—21 of FIG. 8.
Figure 22:
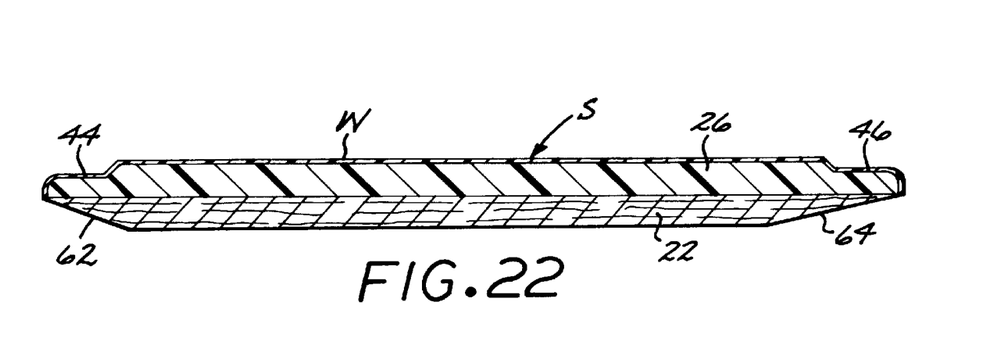
FIG. 22 is a vertical sectional view taken in enlarged scale along line 22—22 of FIG. 12.
Figure 23:
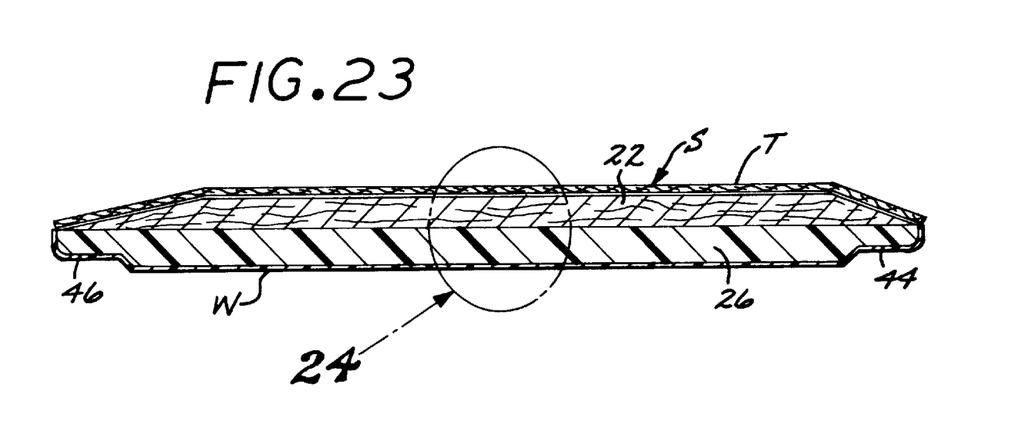
FIG. 23 is a vertical sectional view taken in enlarged scale along line 23—23 along FIG. 15.
Figure 24:
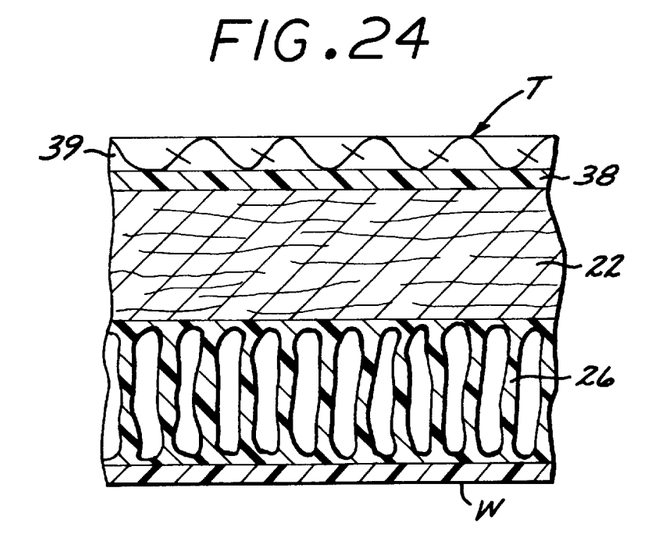
FIG. 24 is a still further enlarged view of the encircled area designated 24 in FIG. 23.

The polyurethane layer 26 provides a cushioned grasp of the player's hand on a golf club or tennis racquet handle and also enhances the player's grip by providing increased tackiness between the player's hand and the grip. The felt layer 22 provides strength to the polyurethane layer 26 and serves as a means for attaching the bonded-together polyurethane and felt strip to a handle. As shown particularly in FIG. 15, the underside 24 of the felt layer 22 is provided with a conventional adhesive material 38. Such adhesive material 38 may be carried by a conventional double-faced tape T wherein the adhesive is originally covered with a protective quick-release cover 39, shown particularly in FIG. 16. If desired, the polyurethane layer of strip S may be formed with vertically extending perforations (not shown) which frictionally enhance the grasp of a user's hands on the grip and also increase the rate of sweat absorption. Alternatively, other types of depressions can be formed in the polyurethane layer to frictionally enhance the grip of a user's hands of the grip e.g. tread patterns.

Figure 1:
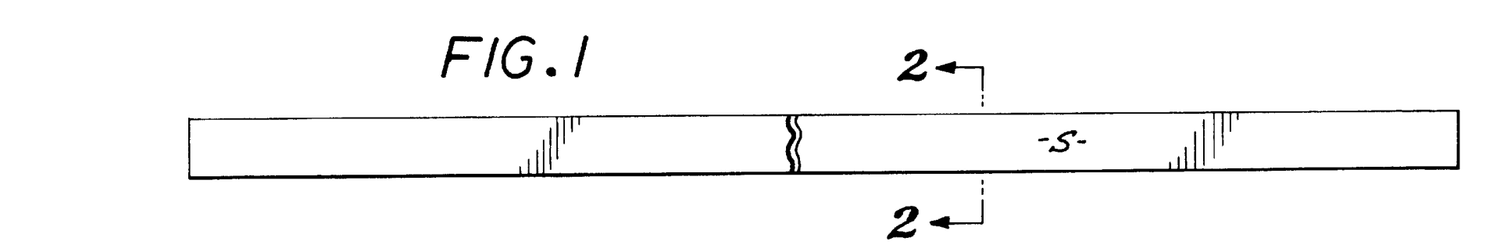
FIG. 1 is a broken top plan view of a polyurethane-felt strip before it is processed in accordance with the method of the present invention.

FIG. 1 is a top plan view of the strip S before it has been cut to the proper dimensions to be wrapped about for example, a golf club handle. In FIG. 4 the strip S is shown after it has been cut to the proper dimensions to be wrapped about either a tennis racquet or golf club handle, i.e. the ends of the strip have been cut so as to define starting and trailing edges 40 and 42 respectively.

Figures 5, 6, 7:
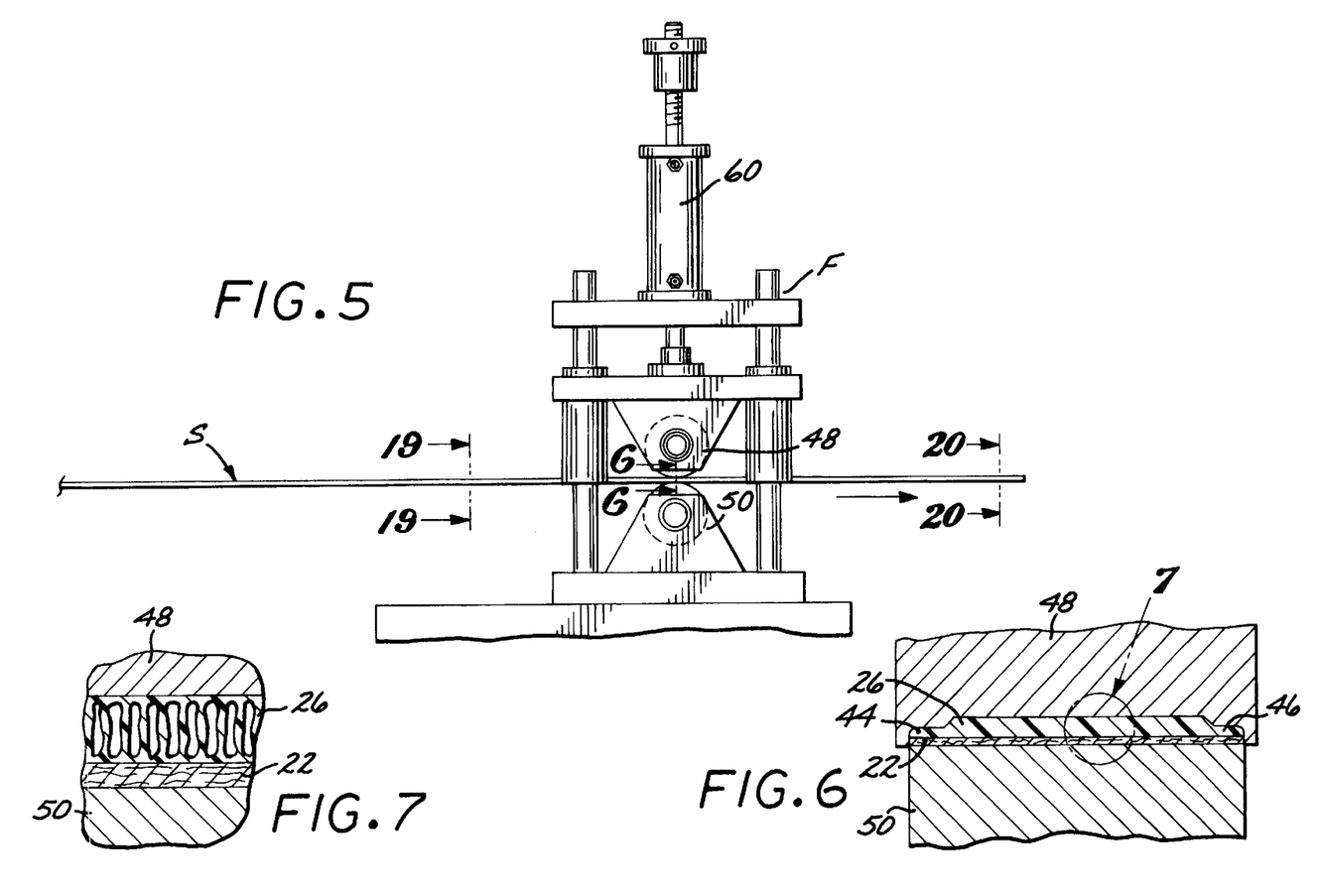
FIG. 5 is a side elevational view showing the upper side edges of the polyurethane layer of the strip being permanently compressed to define reinforced side edges along the length of the strip.
FIG. 6 is a vertical sectional view taken in enlarged scale along line 6—6 of FIG. 5.
FIG. 7 is a further enlarged view of the encircled area designated 7 in FIG. 6.
Figure 8:
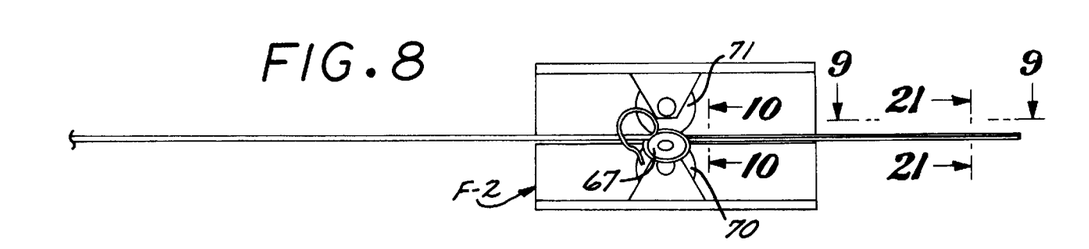
FIG. 8 is a top plan view showing the underside of the edges of the strip being skived.
Figure 9:
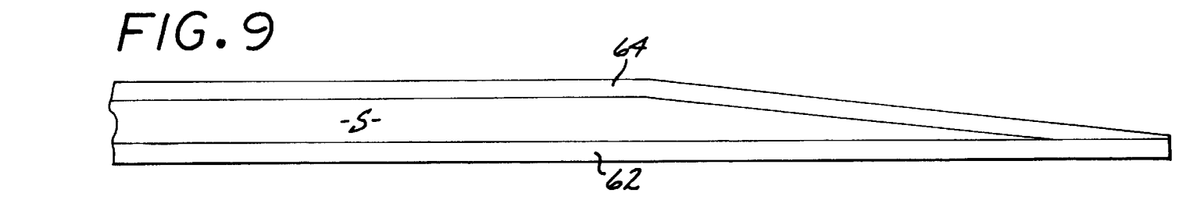
FIG. 9 is a broken view of the underside of the strip after the side edges of the felt layer thereof have been skived.
Figure 10:
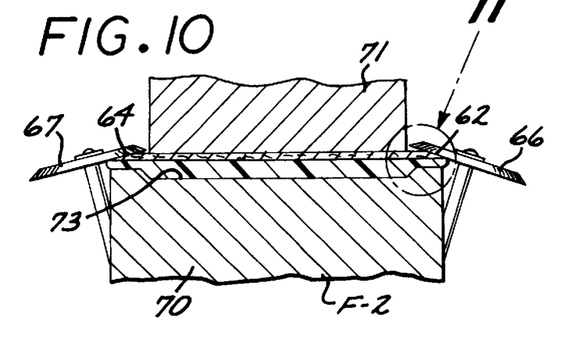
FIG. 10 is a vertical section view taken in enlarged scale along line 10—10 of FIG. 8.
Figure 11:
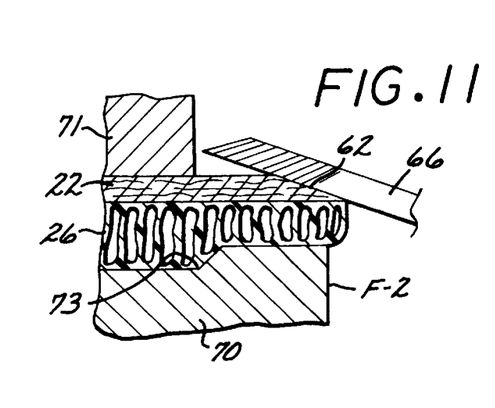
FIG. 11 is a further enlarged view of the encircled area designated 11 in FIG. 10.

In FIGS. 5, 6 and 7, the strip S is shown being formed with sidewardly and outwardly extending recessed reinforcement side edges 44 and 46. The reinforcement side edges are formed along the major portion of the polyurethane layer 26 by means of heated upper and lower rollers 48 and 50 rotatably supported within a frame F. The lower rollers 50 are fixed relative to the elevation of the frame F, while the upper roller 48 is vertically adjustably supported on the frame F by means of a vertically extending screwjack 60 of conventional construction. Such vertical adjustment of the upper roller permits strips of varying height to be accommodated by the frame F, as well as permitting ready adjustment of the depth of the reinforcement side edges 44 and 46. The upper rollers are heated in a conventional manner, as by means of electrical resistance elements (not shown). Such heated rollers compress the side portions of the polyurethane layer 26 below the normal upper layer of such polyurethane surface in the manner shown in FIG. 6. Such compression increases the density and strength of the polyurethane layer in the vicinity of its side edges. It has been found that the width of the recessed reinforcement side edges may be approximately 2 mm, while the depth of the major portion thereof may approximate 0.5 mm. It should be understood that one or both of the upper and lower rollers are rotated by suitable by suitable power-operated means (not shown) so as to effect longitudinal movement of strip S therebetween.

Referring now to FIGS. 8 through 11, after the reinforcement side edges 44 and 46 have been formed, the strip S is inverted and the side edges of felt layer 22 are skived to form outwardly and upwardly extending side edges 62 and 64 by a pair of power-driven rotary knives 66 and 67. The knives 66 and 67 are of like construction and are carried at the upper end of rotatable shafts 68 and 69 supported by the base of a frame F-2. As indicated particularly in FIGS. 10 and 11, the strip S is compressed against bottom roller 70 by means of a top roller 71 so as to firmly maintain the strip S within a cavity 73 formed in the bottom roller 70. The bottom and top rollers 70 and 71 are power-rotated in a conventional manner so as to effect longitudinal movement of strip S therebetween during the skiving operation.

Figure 12:
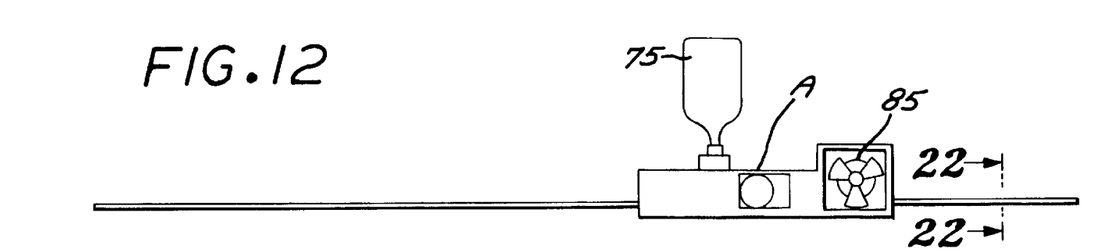
FIG. 12 is a side elevational view showing the strip being moved through an applicator that applies a waterproof resistant coating to the upper surface of the strip.
Figure 13:
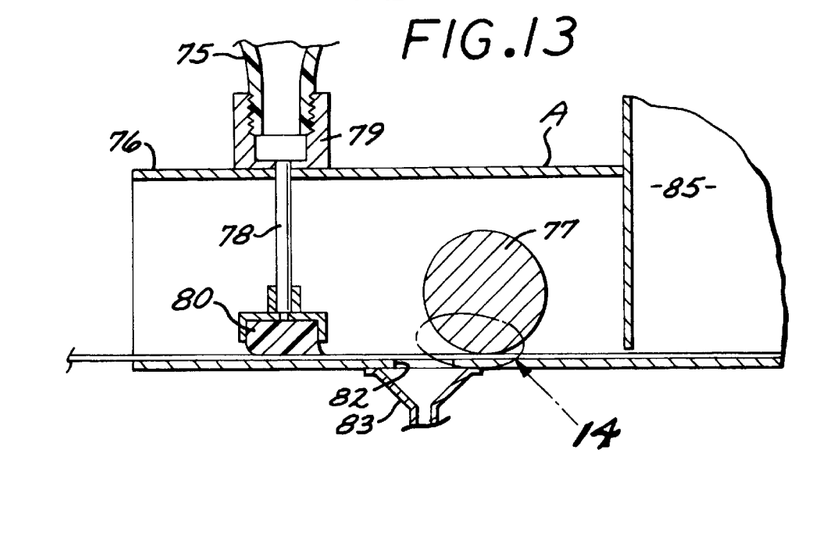
FIG. 13 is an enlarged side elevational view showing a detail of the applicator of FIG. 12.
Figure 14:
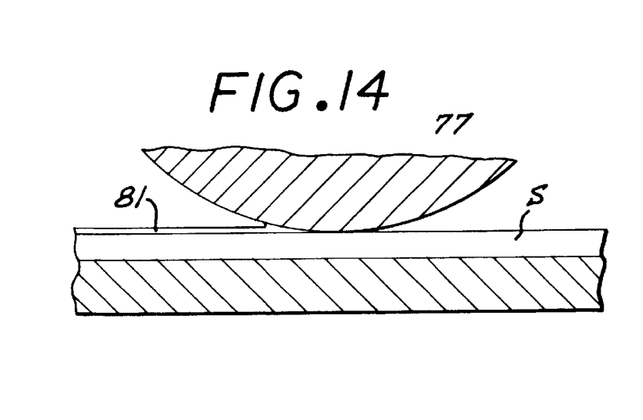
FIG. 14 is a still further enlarged view of the encircled area designated 14 in FIG. 13.

Referring now to FIGS. 12, 13 and 14, after the skiving has been formed on the side edges 62 and 64 of strip S, the strip is again inverted and longitudinally moved through applicator A for depositing upon the upper surface of the strip a coating W of waterproof material. Such coating W may be made by dissolving polyurethane resin in methyl ethyl ketone. The resulting liquid is dispensed from a container bottle 75 supported within an open-ended box 76 of the applicator A as the strip S is longitudinally moved through such box. The box 76 encloses a horizontal roller 77 which is vertically adjustable in elevation so as to control the depth of the liquid coating W applied to the upper surface of the strip. Such vertical adjustment of the roller 77 makes it possible to coat strips of varying heights within the box 76. The roller 77 is power-driven in a conventional manner so as to effect longitudinal movement of the strip through the applicator A. The liquid coating W is deposited upon the upper surface of the strip S by means of a vertical tube 78 extending downwardly from a threaded cup 79 which supports the lower end of the container bottle 75 onto a resilient sponge 80. Excess water proofing liquid 81 flows downwardly from the lower wall of the box through an opening 82 into a funnel 83, with excess liquid being periodically returned to the container 75 as indicated in FIGS. 13 and 14. The exit portion of the box 76 is formed with a ventilation chamber 85 through which air is moved by means of a conventional electric motor driven fan 85. In this manner, the liquid 81 is dried as the strip S is moved horizontally through the box so as to form the waterproof coating W on the upper surface of the strip S.

The final step in the method of making a waterproof strip S embodying the present invention is shown in FIGS. 15–18. Referring thereto, after the strip S has moved through the waterproof coating applicator A, it is again inverted and fed through a tape applicator TA. Such tape applicator includes two pairs of vertically aligned rollers 90, 91 and 92, 93. Either one or both pairs of rollers maybe power-driven in a conventional manner so as to effect longitudinal movement of the strip S through the tape applicator TA. A length of conventional double faced adhesive tape T is carried by a supply drum 95. Such double-faced adhesive tape consists of an adhesive 38 applied to the underside of a quick-release paper 39. As the strip S moves longitudinally to the right in FIG. 15, the underside of the double faced adhesive tape T is adhered to the upper surface of the felt layer 22 of the strip S in the manner indicated in FIGS. 16, 17 and 18. The tape is cut off the supply drum to the proper length.

Referring now to FIGS. 25, 26 and 27, the completed strip S is shown being spirally wrapped about the handle H of a golf club after quick-release paper 39 has been removed from adhesive 38. It is important to note that the underside of the recessed side edges 44 and 46 of the polyurethane layer 26 overlap one another, with such edges being secured together in a water tight manner by adhesive 38. The provision of the skived slanted side edges 62 and 64 of felt layer 22 permits such overlapping of the recessed side edges. If the slanted side edges 62 and 64 have different widths, (e.g., 2–3 mm for the shorter edge and about 5 mm for the wider edge) a more pleasing longitudinal profile of the grip will be obtained, while the narrower slanted side edge reduces the amount of felt layer cutoff thereby maintaining the strength of the completed strip.

A golf club grip G made in accordance with the present invention permits a golfer to continue playing even during rainy conditions and also minimizes the slippage effect of perspiration of build-up on a golf club or tennis racquet because of the waterproof coating W. In addition, the grip G will remain affixed to the golf club or tennis racquet handle without unraveling because of the provision of the recessed side edges 44 and 46 in combination with the skived side edges 62 and 63. The interaction between the surfaces of the reinforced side edges and the skived side edges inhibits leakage of water into the interior structure of the grip. It is important to note that a grip embodying the present invention inhibits soilage accumulating during use of the grip, but any such soilage can be readily removed by merely washing such soilage off the surface of the waterproof coating W.

While a particular form of the invention has been illustrated and described, it will be apparent to those skilled in the art that various modifications can be made without departing from the spirit and scope of the invention. By way of example, a continuous length of strip material could be longitudinally moved through the reinforcement side edge forming rollers 48 and 50, the rotary knives 66 and 67, the waterproof liquid applicator A and the tape applicator TA, with such continuous length of strip being inverted between the steps of the method of the present invention. Accordingly, it is not intended that the invention be limited except by the appended claims.

What is claimed is:

1. A method of making a moisture resistant handle grip, comprising the steps of:
    forming a strip by bonding a felt layer onto the underside of a polyurethane layer;
    longitudinally moving the strip along a horizontal path;
    providing heated roller means at a point on such path which engage the side edges of the polyurethane layer to permanently compress such side edges and define recessed reinforced side edges on the strip;
    knife means at a point on such path which skive the side edges of the felt layer;
    providing a waterproof liquid;
    disposing such liquid in a container disposed above the strip at a point on the path whereby the liquid is deposited upon the upper surface of the strip as the strip moves along the path;
    providing a rotating cylinder in the path of the strip upstream of the container;
    adjusting the vertical space between the upper surface of the strip and the underside of the cylinder to control the thickness of the liquid relative to the upper surface of the strip;
    providing a ventilation chamber in the path of the strip upstream of the rotating cylinder;
    passing air through the ventilation chamber to dry the liquid on the upper surface of the strip and thereby form a waterproof coating on the upper surface of the strip;
    applying an adhesive to the underside of the felt layer; and
    spirally wrapping the strip about the handle grip with the underside of adjoining recessed side edges overlapping one another to form a water retarding joint between the adjoining side edges.

2. The combination of claim 1, wherein the waterproof liquid is polyurethane resin dissolved in ethyl ketone.

3. A method of making a moisture resistant golf club grip, said method comprising:
    forming a strip consisting of an open-pored felt layer having a generally flat inner surface to encompass a handle and a flat closed pore polyurethane layer having its inner surface bonded to the outer surface of the felt layer, with the pores of such polyurethane layer extending generally normal to the longitudinal axis of the strip, and with the felt layer providing strength for the polyurethane layer while the polyurethane layer both absorb shocks and provides tackiness so as to inhibit slippage of a user's hand relative to a handle;
    applying a heated element against the side edges of the polyurethane layer with sufficient pressure to compress the material of the polyurethane inwardly of the upper surface of such layer to define recessed reinforcement side edges on the polyurethane layer;
    applying a waterproof coating over the upper surface of the polyurethane layer including the reinforcement side edges;
    skiving the underside of the felt layer to form outwardly and downwardly slanted side edges along the length of the felt layer;
    applying an adhesive to the underside of the felt layer;
    providing a resilient sleeve; and
    spirally wrapping the strip around the sleeve with the slanted side edges of the felt layer overlapping one another to form a water retarding joint between the adjoining side edges.

4. The combination of claim 3, wherein the waterproof coating is polyurethane resin dissolved in ethyl ketone.

5. A method of making a moisture resistant handle grip, comprising the steps of:

forming a strip by bonding a felt layer onto the underside of a polyurethane layer;

applying a heated element against the side edges of the polyurethane layer with sufficient pressure to compress the material of the polyurethane inwardly of the upper surface of such layer to define recessed reinforcement side edges on the polyurethane layer;

applying a waterproof coating over the upper surface of the polyurethane layer including the reinforcement side edges;

skiving the underside of the felt layer to form outwardly and downwardly slanted side edges along the length of the felt layer;

applying an adhesive to the underside of the felt layer;

providing a resilient sleeve; and spirally wrapping the strip around the sleeve with the slanted side edges of the felt layer overlapping one another to form a water retarding joint between the adjoining side edges.

6. The combination of claim 5, wherein the waterproof coating is polyurethane resin dissolved in ethyl ketone.

* * * * *